(12) United States Patent
Chretien et al.

(10) Patent No.: US 11,308,793 B2
(45) Date of Patent: Apr. 19, 2022

(54) REMOTE CONTROL DEVICE AND METHOD FOR INTERACTING WITH A CONTROLLED APPLIANCE VIA THE BLE STANDARD

(71) Applicant: Distech Controls Inc., Brossard (CA)

(72) Inventors: Arthur Chretien, Lyons (FR); Franck Forestier, Solaize (FR)

(73) Assignee: DISTECH CONTROLS INC., Brossard (CA)

( * ) Notice: Subject to any disclaimer, the term of this patent is extended or adjusted under 35 U.S.C. 154(b) by 9 days.

(21) Appl. No.: 16/704,665

(22) Filed: Dec. 5, 2019

(65) Prior Publication Data

US 2020/0334975 A1 Oct. 22, 2020

Related U.S. Application Data

(60) Provisional application No. 62/834,652, filed on Apr. 16, 2019.

(51) Int. Cl.
*G08C 17/02* (2006.01)
*H04W 4/80* (2018.01)

(52) U.S. Cl.
CPC .............. *G08C 17/02* (2013.01); *H04W 4/80* (2018.02); *G08C 2201/34* (2013.01); *G08C 2201/92* (2013.01)

(58) Field of Classification Search
CPC ............................ G08C 17/02; G08C 2201/92; G08C 2201/20; H04W 4/80; H04W 84/18; G01S 13/003; G01S 7/415
(Continued)

(56) References Cited

U.S. PATENT DOCUMENTS

| 4,418,333 A | 11/1983 | Schwarzbach et al. |
| 4,442,319 A | 4/1984 | Treidl |

(Continued)

FOREIGN PATENT DOCUMENTS

| EP | 3182699 A1 | 6/2017 |
| WO | WO2015153640 A1 | 10/2015 |

OTHER PUBLICATIONS

Non-final Office Action for U.S. Appl. No. 16/705,792, dated Apr. 28, 2021, 22 pages.

(Continued)

*Primary Examiner* — Vernal U Brown
(74) *Attorney, Agent, or Firm* — RatnerPrestia

(57) ABSTRACT

Remote control device and method for controlling interactions between the remote control device and a controlled appliance. The remote control device comprises a BLE interface and a battery for powering the BLE interface. Upon determination of a first condition being met, the remote control device sets the BLE interface in a standby mode where the power supplied by the battery to the BLE interface is limited to a minimal value. Upon determination of a second condition being met, the remote control device transmits one or more BLE advertising signal via the BLE interface. The remote control device receives a connection request from a controlled appliance via the BLE interface, establishes a connection between the remote control device and the controlled appliance through the BLE interface, and exchanges data with the controlled appliance via the BLE communication interface (e.g. transmission of a command for an actuator of the controlled appliance).

20 Claims, 4 Drawing Sheets

(58) Field of Classification Search
USPC .................................................... 340/10.3
See application file for complete search history.

(56) References Cited

U.S. PATENT DOCUMENTS

| | | | |
|---|---|---|---|
| 9,449,229 B1 | 9/2016 | Laska et al. | |
| 9,986,594 B2 | 5/2018 | Goel et al. | |
| 10,082,555 B1 | 9/2018 | de la Broise et al. | |
| 10,496,508 B2 | 12/2019 | Mathews | |
| 2003/0190018 A1 | 10/2003 | Bleile et al. | |
| 2009/0046715 A1 | 2/2009 | McCoy | |
| 2009/0315752 A1* | 12/2009 | Bank | G08C 17/02 341/176 |
| 2011/0298700 A1* | 12/2011 | Ito | H04M 1/72415 345/156 |
| 2015/0234372 A1 | 8/2015 | Slupik et al. | |
| 2015/0271432 A1* | 9/2015 | Muth | H04W 12/50 348/552 |
| 2016/0195856 A1* | 7/2016 | Spero | G05B 15/02 700/90 |
| 2016/0218884 A1 | 7/2016 | Ebrom et al. | |
| 2017/0006415 A1 | 1/2017 | Song | |
| 2017/0171798 A1 | 6/2017 | Song | |
| 2017/0279496 A1 | 9/2017 | Schultz et al. | |
| 2018/0012463 A1 | 1/2018 | Chaudhry et al. | |
| 2018/0103229 A1 | 4/2018 | Yang et al. | |
| 2018/0176112 A1 | 6/2018 | McLaughlin et al. | |
| 2018/0176729 A1 | 6/2018 | Mycek et al. | |
| 2018/0191890 A1* | 7/2018 | Ham | G08C 23/04 |
| 2018/0217003 A1 | 8/2018 | Fadell et al. | |
| 2018/0349242 A1 | 12/2018 | Mathews | |
| 2019/0123904 A1 | 4/2019 | Ackerman et al. | |
| 2019/0271958 A1 | 9/2019 | Gaillet et al. | |
| 2019/0391543 A1 | 12/2019 | Gagnon et al. | |
| 2020/0050753 A1 | 2/2020 | Davis et al. | |
| 2020/0137542 A1* | 4/2020 | Jung | H04W 4/80 |

OTHER PUBLICATIONS

Notice of Allowance for U.S. Appl. No. 16/705,792, dated Dec. 7, 2021, 12 pages.

* cited by examiner

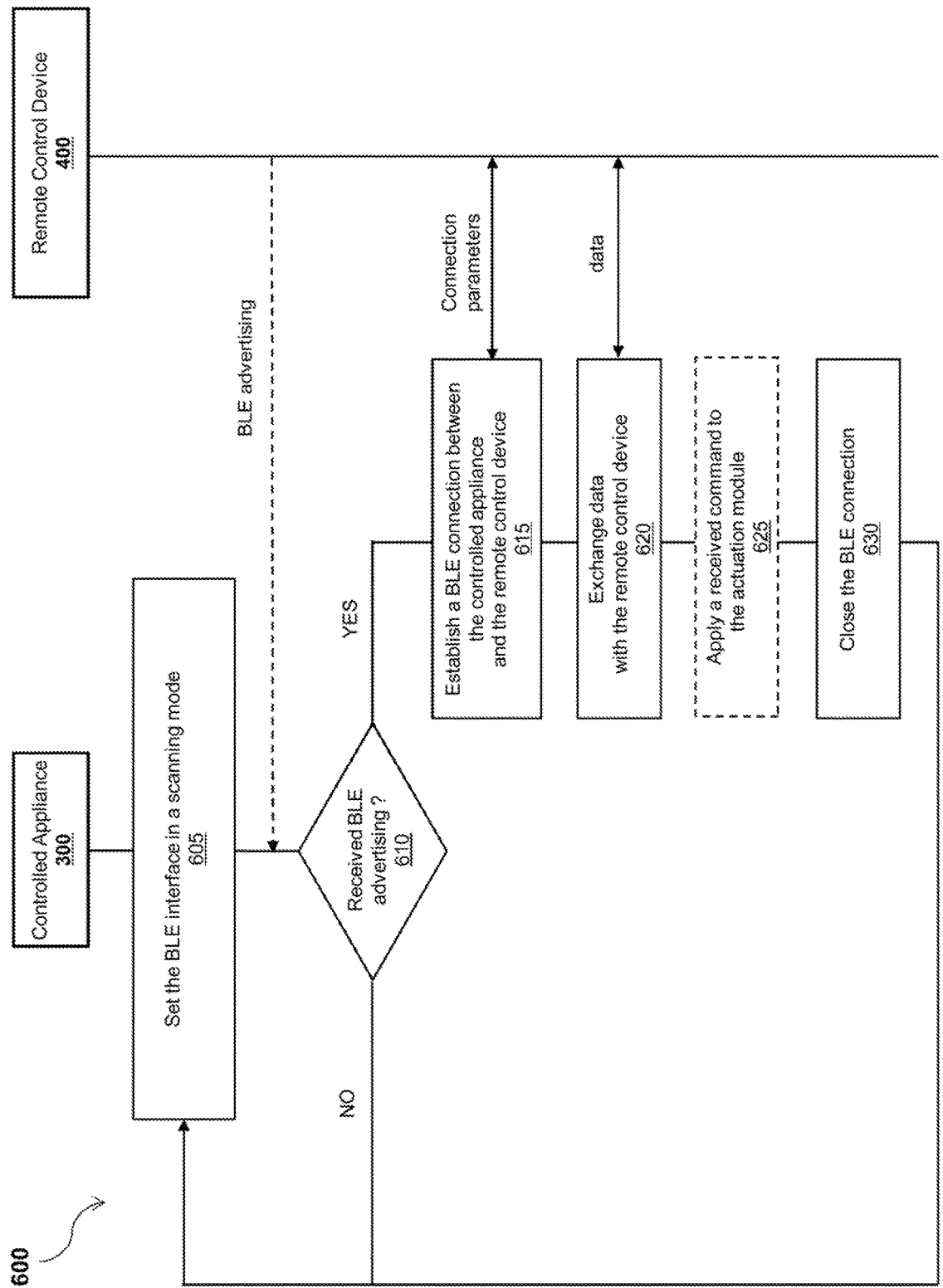

REMOTE CONTROL DEVICE AND METHOD FOR INTERACTING WITH A CONTROLLED APPLIANCE VIA THE BLE STANDARD

CROSS-REFERENCE TO RELATED APPLICATIONS

This Application claims priority to U.S. Provisional Patent Application No. 62/834,652, filed Apr. 16, 2019, titled "REMOTE CONTROL DEVICE AND METHOD FOR INTERACTING WITH A CONTROLLED APPLIANCE VIA THE BLE STANDARD," the disclosure of which is incorporated herein by reference in its entirety for all purposes.

TECHNICAL FIELD

The present disclosure relates to the field of building automation, and more precisely environmental condition control in an area of a building. More specifically, the present disclosure presents a remote control device and method for interacting with a controlled appliance via the Bluetooth® Low Energy (BLE) standard.

BACKGROUND

Systems for controlling environmental conditions, for example in buildings, are becoming increasingly sophisticated. An environment control system may at once control heating and cooling, monitor air quality, detect hazardous conditions such as fire, carbon monoxide release, intrusion, and the like. Such environment control systems generally include at least one environment controller, which receives measured environmental values, generally from external sensors, and in turn determines set-points or command parameters to be sent to controlled appliances.

The environment controller and the devices under its control (sensors, controlled appliances, etc.) are generally referred to as Environment Control Devices (ECDs). An ECD comprises processing capabilities for processing data received via one or more communication interface and/or generating data transmitted via the one or more communication interface. Each communication interface may be of the wired or wireless type.

The generalization of the Bluetooth® Low Energy (BLE) standard allows BLE enabled user devices to interact with ECDs of an environment control system which also support the BLE standard.

For example, a controlled appliance receives commands from a remote control device through a BLE connection between the controlled appliance and the remote control device. The remote control device is similar to remote controls used for controlling a television, a stereo equipment, etc. When a user presses a button of the remote control device, a corresponding command is transmitted to the controlled appliance via the BLE protocol.

The usage of the BLE standard (which has been designed to be energy efficient) limits power consumption on the remote control device. By limiting the power consumption, the lifetime of a battery powering the remote control device is extended. However, the power consumption needs to be further reduced, by optimizing the usage of the functionalities provided by the BLE standard for implementing the (BLE) interactions between the remote control device and the controlled appliance.

Therefore, there is a need for a new remote control device and method for interacting with a controlled appliance via the BLE standard.

SUMMARY

According to a first aspect, the present disclosure relates to a remote control device comprising a radio frequency (RF) communication interface, a battery for powering at least the RF communication interface, and a processing unit. The processing unit sets the RF communication interface in a standby mode where the power supplied by the battery to the RF communication interface is limited to a minimal value, upon determination of a first condition being met. The processing unit transmits at least one RF advertising signal via the RF communication interface, upon determination of a second condition being met. The processing unit receives via the RF communication interface a connection request from a controlled appliance. The processing unit establishes a connection between the remote control device and the controlled appliance through the RF communication interface. The processing unit exchanges data with the controlled appliance via the RF communication interface.

According to a second aspect, the present disclosure relates to a method for controlling interactions between a remote control device and a controlled appliance. The method comprises, upon determination by a processing unit of the remote control device that a first condition is met, setting an RF communication interface of the remote control device in a standby mode where the power supplied by a battery of the remote control device to the RF communication interface is limited to a minimal value. The method comprises, upon determination by the processing unit that a second condition is met, transmitting at least one RF advertising signal via the RF communication interface. The method comprises receiving, by the processing unit via the RF communication interface, a connection request from the controlled appliance. The method comprises establishing, by the processing unit, a connection between the remote control device and the controlled appliance through the RF communication interface. The method comprises exchanging, by the processing unit, data with the controlled appliance via the RF communication interface.

According to a third aspect, the present disclosure relates to a non-transitory computer program product comprising instructions executable by a processing unit of a remote control device. The execution of the instructions by the processing unit of the remote control device provides for controlling interactions between the remote control device and a controlled appliance by implementing the aforementioned method.

According to a fourth aspect, the present disclosure relates to a computing device comprising a radio frequency (RF) communication interface, a power supply for powering at least the RF communication interface, and a processing unit. The processing unit sets the RF communication interface in a standby mode where the power supplied by the power supply to the RF communication interface is limited to a minimal value, upon determination of a first condition being met. The processing unit transmits at least one RF advertising signal via the RF communication interface, upon determination of a second condition being met. The processing unit receives via the RF communication interface a connection request from a controlled appliance. The processing unit establishes a connection between the computing device and the controlled appliance through the RF communication interface. The processing unit exchanges data with the controlled appliance via the RF communication interface.

In a particular aspect, the RF communication interface is a Bluetooth® Low Energy (BLE) communication interface.

BRIEF DESCRIPTION OF THE DRAWINGS

Embodiments of the disclosure will be described by way of example only with reference to the accompanying drawings, in which:

FIG. 4 represents a method implemented by the controlled appliance of FIGS. 1 and 2 for controlling interactions (via the BLE standard) with the remote control device of FIGS. 1 and 2.

DETAILED DESCRIPTION

Figure 1:
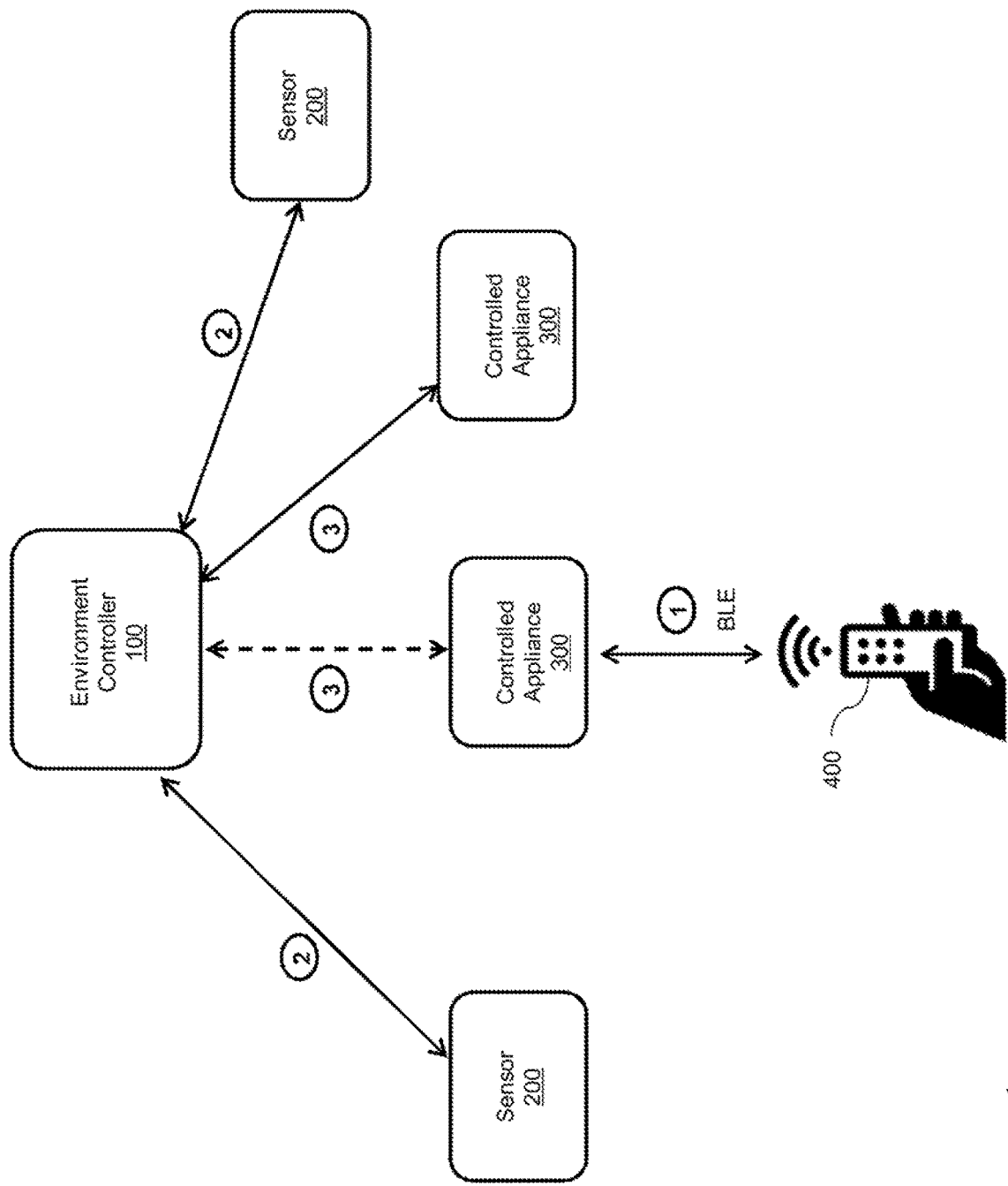
FIG. 1 represent interactions between devices of an environment control system comprising a controlled appliance and a remote control device.

The foregoing and other features will become more apparent upon reading of the following non-restrictive description of illustrative embodiments thereof, given by way of example only with reference to the accompanying drawings.

Various aspects of the present disclosure generally address one or more of the problems related to environment control systems for buildings. More particularly, the present disclosure aims at providing solutions for optimizing power consumption on a remote control device interacting with a controlled appliance via the BLE standard (or another standard having similar characteristics).

The following terminology is used throughout the present specification:
Environment: condition(s) (temperature, pressure, oxygen level, light level, security, etc.) prevailing in a controlled area or place, such as for example in a building.
Environment control system: a set of components which collaborate for monitoring and controlling an environment.
Environmental data: any data (e.g. information, commands) related to an environment that may be exchanged between components of an environment control system.
Environment control device (ECD): generic name for a component of an environment control system. An ECD may consist of an environment controller, a sensor, a controlled appliance, etc.
Environment controller: device capable of receiving information related to an environment and sending commands based on such information.
Environmental characteristic: measurable, quantifiable or verifiable property of an environment (a building). The environmental characteristic comprises any of the following: temperature, pressure, humidity, lighting, $CO_2$, flow, radiation, water level, speed, sound; a variation of at least one of the following, temperature, pressure, humidity and lighting, $CO_2$ levels, flows, radiations, water levels, speed, sound levels, etc., and/or a combination thereof.
Environmental characteristic value: numerical, qualitative or verifiable representation of an environmental characteristic.
Sensor: device that detects an environmental characteristic and provides a numerical, quantitative or verifiable representation thereof. The numerical, quantitative or verifiable representation may be sent to an environment controller.
Controlled appliance: device that receives a command and executes the command. The command may be received from an environment controller.
Environmental state: a current condition of an environment based on an environmental characteristic, each environmental state may comprise a range of values or verifiable representation for the corresponding environmental characteristic.
VAV appliance: a Variable Air Volume appliance is a type of heating, ventilating, and/or air-conditioning (HVAC) system. By contrast to a Constant Air Volume (CAV) appliance, which supplies a constant airflow at a variable temperature, a VAV appliance varies the airflow at a constant temperature.
Area of a building: the expression 'area of a building' is used throughout the present specification to refer to the interior of a whole building or a portion of the interior of the building such as, without limitation: a floor, a room, an aisle, etc.
Remote control device: a traditional remote control similar to the ones used for controlling a television, a stereo equipment, etc.; but adapted for controlling a controlled appliance of an environment control system. By extension, any device implementing a remote control functionality (e.g. a smartphone or a tablet implementing the remote control functionality) adapted for controlling a controlled appliance of an environment control system.

Figure 2:
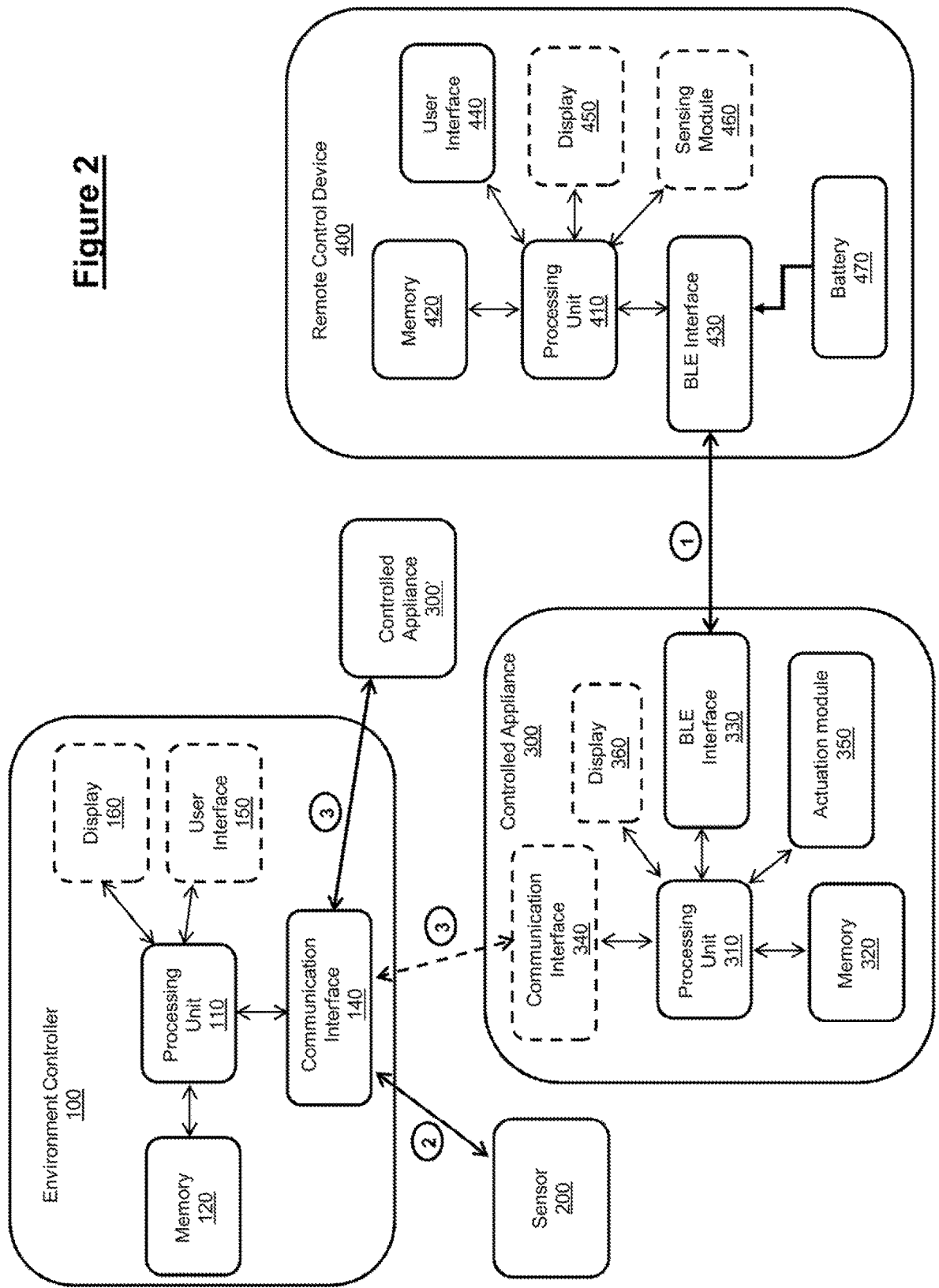
FIG. 2 represents a functional diagram detailing component of several devices of the environment control system of FIG. 1.

Reference is now made concurrently to FIGS. 1 and 2. An environment control system is represented, where an environment controller 100 exchanges data with other environment control devices (ECDs). The environment controller 100 is responsible for controlling the environment of an area of a building. The environment controller 100 receives from sensors 200 environment characteristic values measured by the sensors 200. The environment controller 100 generates commands based on the received environment characteristic values. The generated commands are transmitted to controlled appliances 300 (to control the operations of the controlled appliances 300).

The area under the control of the environment controller 100 is not represented in the Figures for simplification purposes. As mentioned previously, the area may consist of a room, a floor, an aisle, etc. (of a building). However, the area under the control of the environment controller 100 is not limited to being inside a building. Outdoor areas such as a street, a parking lot, a stadium, a private outdoor space surrounding a building, etc. also fall within the scope of the present disclosure.

Examples of sensors 200 include a temperature sensor, capable of measuring a current temperature and transmitting the measured current temperature to the environment controller 100. The examples also include a humidity sensor, capable of measuring a current humidity level and transmitting the measured current humidity level to the environment controller 100. The examples further include a carbon dioxide (CO2) sensor, capable of measuring a current CO2 level and transmitting the measured current CO2 level to the environment controller 100. The examples also include a lighting sensor, capable of measuring a current lighting level in the area and transmitting the measured lighting level to the environment controller 100. The examples further include an occupancy sensor, capable of determining a current occupancy of the area and transmitting the determined current occupancy of the area to the environment controller 100.

The aforementioned examples of sensors 200 are for illustration purposes only. Other types of sensors 200 could be used in the context of an environment control system managed by the environment controller 100. Furthermore, each environmental characteristic value measured by a sensor 200 may consist of either a single value (e.g. current temperature of 25 degrees Celsius), or a range of values (e.g. current temperature in the range of 25 to 26 degrees Celsius).

Only two sensors 200 are represented in FIG. 1 for simplification purposes. However, any number of sensors 200 and any types of sensors 200 (temperature, humidity level, CO2 level, etc.) may be deployed in the area under the control of the environment controller 100.

Furthermore, in some cases, a single sensor 200 measures a given type of environment characteristic value (e.g. temperature) for the whole area. Alternatively, the area is divided into a plurality of zones, and a plurality of sensors 200 measures the given type of environment characteristic value (e.g. temperature) in the corresponding plurality of zones.

Each controlled appliance 300 comprises at least one actuation module. The actuation module can be of one of the following type: mechanical, pneumatic, hydraulic, electrical, electronical, a combination thereof, etc. The commands sent by the environment controller 100 actuate the at least one actuation module. The controlled appliance 300 controls one or more environment characteristic (e.g. temperature, pressure level, lighting level, etc.) in the area under its control via the at least one actuation module. The controlled appliance 300 is physically located in the area. Alternatively, the controlled appliance 300 is not physically located in the area, but remotely controls the one or more environment characteristic in the area.

An example of a controlled appliance 300 consists of a VAV appliance. Examples of commands transmitted to the VAV appliance 300 include commands directed to one of the following: an actuation module controlling the speed of a fan, an actuation module controlling the pressure generated by a compressor, an actuation module controlling a valve defining the rate of an airflow, etc.

Another example of a controlled appliance 300 consists of a smart thermostat. Examples of commands transmitted to the smart thermostat 300 include commands (e.g. raise or lower the temperature in the area) directed to an actuation module of the smart thermostat 300. The actuation module of the smart thermostat 300 controls the heat generated by one or more electric heater (not represented in the Figures) located in the area.

The previous examples are for illustration purposes only. Other types of controlled appliances 300 could be used in the context of an environment control system managed by the environment controller 100.

A remote control device 400 is also represented in FIG. 1. The remote control device 400 is capable of remotely controlling at least one of the controlled appliances 300. Thus, each controlled appliance 300 represented in FIG. 1 may be controlled by the environment controller 100 only, by the remote control device 400 only, or concurrently by the environment controller 100 and the remote control device 400.

The remote control device 400 is a device dedicated to implementing a remote control functionality. Alternatively, the remote control device 400 is a device implementing several functionalities including a remote control functionality (e.g. a mobile device such as a smartphone or a tablet implementing a remote control functionality).

In the rest of the description, the interactions between the controlled appliance 300 and the remote control device 400 will be performed via the Bluetooth® Low Energy (BLE) protocol. The BLE protocol provides short range wireless interactions between electronic equipment having a communication interface supporting the BLE standard. A well known advantage of the BLE protocol is that it has been designed to be power efficient. Being able to optimize the power consumption of the remote control device 400 is a key feature of the present disclosure.

However, other Radio Frequency (RF) communication protocols may also be used in place of the BLE protocol, provided that these other RF communication protocols provide functionalities similar to the one detailed in the rest of the description when the BLE protocol is used for the interactions between the controlled appliance 300 and the remote control device 400.

Following is a reminder of the different modes adopted by a device using the BLE protocol.

Standby mode: the device is neither emitting nor receiving BLE signals. The power consumption of a BLE communication interface in this mode is minimal, compared to the other modes.

Scanning mode: the device is in a scanning phase, searching for other devices which are emitting BLE signals in the vicinity.

Advertising mode: the device emits BLE signals designed to indicate to other devices that it can make itself available for an exchange of data.

Initiating mode: when a first device in the scanning mode encounters a second device in the advertising mode, the first device goes into initiating mode in order to attempt to initiate a BLE connection with the second device.

Connected mode: following an exchange of different control identifiers during the initiating phase, the first and second devices enter the BLE connected mode, in which they can exchange data. Once connected, the data are exchanged in both directions.

The transmission of commands from the environment controller 100 to the controlled appliances 300 is represented with the reference number 3 in FIGS. 1-2. The transmission of commands from the remote control device 400 to the controlled appliances 300 is represented with the reference number 1 in FIGS. 1-2. The transmission of environmental characteristic values from the sensors 200 to the environment controller 100 is represented with the reference number 2 in FIGS. 1-2.

Referring more specifically to FIG. 2, details of the remote control device 400, the controlled appliance 300 and the environment controller 100, are provided.

The remote control device 400 comprises a processing unit 410, memory 420, a BLE interface 430, a user interface 440, optionally a display 450, optionally one or more sensing module 460, and a battery 470. The remote control device 400 may comprise additional components, such as another communication interface (not represented in FIG. 2 for simplification purposes), etc.

The processing unit 410 comprises one or more processors (not represented in FIG. 2) capable of executing instructions of a computer program. Each processor may further comprise one or several cores.

The memory 420 stores instructions of computer program(s) executed by the processing unit 410, data generated by the execution of the computer program(s), data received via the BLE interface 430 (or another communication interface), data received via the user interface 440, etc. Only a single memory 420 is represented in FIG. 2, but the remote control device 400 may comprise several types of memories, including volatile memory (such as a volatile Random Access Memory (RAM), etc.) and non-volatile memory (such as electrically-erasable programmable read-only memory (EEPROM), etc.).

The BLE interface 430 allows the remote control device 400 to exchange data with remote devices (in particular with the controlled appliance 300) in accordance with the BLE standard.

As mentioned previously, the remote control device 400 may include at least one additional communication interface (not represented in FIG. 2). For example, in the case of a traditional remote control 400, the additional communication interface is an infrared (IR) communication interface for exchanging data with controlled devices which do not support the BLE standard, but support the IR standard. In the case of a mobile device 400 (e.g. smartphone or tablet) having a remote control functionality, the additional communication interface is a cellular communication interface and/or a Wi-Fi communication interface.

The user interface 440 consists of at least one button, which can be pressed by a user for generating a command. The command is transmitted to, and processed by, the processing unit 410. Alternatively, the user interface 440 is integrated with the display 450, and consists of a touch screen user interface.

The optional display 450 is either a regular display or a touchscreen display. The display 450 has a small size adapted to the form factor of the remote control device 400, and is capable of displaying data generated by the processing unit 410 or data received via the BLE interface 430.

The optional sensing module 460 will be detailed later in the description.

The battery 470 provides power to the BLE interface 430, and optionally to one or more other component of the remote control device 400 (e.g. the processing unit 410, the memory 420, etc.). Another battery (not represented in FIG. 2) may be used for providing power to other components of the remote control device 400. The battery 470 generally consists of a long life battery, to avoid having to replace the battery 470 too often (the remote control device 400 may even be designed with a battery 470 which cannot be replaced at all). As mentioned previously, the usage of the BLE interface 430 enables a reduced power consumption from the battery 470, since the BLE protocol has been designed for optimizing power consumption.

The controlled appliance 300 comprises a processing unit 310, memory 320, a BLE interface 330, optionally another communication interface 340, at least one actuation module 350, optionally a display 360. The controlled appliance 300 may comprise additional components, such as, a user interface, etc.

The processing unit 310 comprises one or more processors (not represented in FIG. 2) capable of executing instructions of a computer program. Each processor may further comprise one or several cores.

The memory 320 stores instructions of computer program(s) executed by the processing unit 310, data generated by the execution of the computer program(s), data received via the BLE interface 330 (or the optional communication interface 330), etc. Only a single memory 320 is represented in FIG. 2, but the controlled appliance 300 may comprise several types of memories, including volatile memory (such as a volatile Random Access Memory (RAM), etc.) and non-volatile memory (such as electrically-erasable programmable read-only memory (EEPROM), etc.).

The BLE interface 330 allows the controlled appliance 300 to exchange data with remote devices (in particular with the remote control device 400) in accordance with the BLE standard.

The optional communication interface 340 is used for exchanging data with device(s) which do not support the BLE standard. For example, the communication interface 340 is a Wi-Fi interface or an Ethernet interface used for exchanging data (e.g. commands) with the environment controller 100.

As mentioned previously, the actuation module 350 can be of one of the following types: mechanical, pneumatic, hydraulic, electrical, electronical, a combination thereof, etc. Commands (reference number 1) received from the remote control device 400 via the BLE interface 340 control operations of the actuation module 350. Optionally, commands (reference number 3) received from the environment controller 100 via the other communication interface 340 also control operations of the actuation module 350. Although a single actuation module 350 is represented in FIG. 2, the controlled appliance 340 may include several actuation modules 350. Each actuation module 350 is controlled by the remote control device 400 only, by the environment controller 100 only, or concurrently by the remote control device 400 and the environment controller 100. However, at least one of the actuation modules 350 is controlled by the remote control device 400.

Although a single controlled appliance 300 is represented in FIG. 2, the remote control device 400 may interact with a plurality of BLE enabled controlled appliances 300 through the BLE interface 430.

The environment controller 100 comprises a processing unit 110, memory 120, at least one communication interface 140 (e.g. a Wi-Fi or Ethernet communication interface). The environment controller 100 may comprise additional components, such as a user interface 150, a display 160, etc.

The environment controller 100 exchanges data with at least one controlled appliance 300' via the communication interface 140 for controlling the controlled appliance 300'. As mentioned previously, the environment controller 100 optionally exchanges data with the controlled appliance 300 via the communication interface 140 for controlling the controlled appliance 300 (in this case, the controlled appliance 300 is controlled concurrently by the environment controller 100 and the remote control device 400). The environment controller 100 exchanges data with at least one sensor 200 via the communication interface 140 for receiving environment characteristic values (reference number 2) measured by the sensor 200. Alternatively, the environment controller 100 supports several communication interfaces 140 (e.g. a Wi-Fi interface and an Ethernet interface), which are respectively used for exchanging data with at least one of the controlled appliance 300', the controlled appliance 300 and the sensor 200.

Although a single controlled appliance 300' is represented in FIG. 2, the environment controller 100 may interact with a plurality of controlled appliance 300'. Although a single controlled appliance 300 is represented in FIG. 2, the environment controller 100 may interact with a plurality of controlled appliance 300. Although a single sensor 200 is represented in FIG. 2, the environment controller 100 may interact with a plurality of sensors 200.

A control software (not represented in FIG. 2) executed by the processing unit 110 of the environment controller 100 receives environmental characteristic value(s) from the sensor(s) 200. The control software processes the environmental characteristic value(s), to generate one or more command(s) transmitted to the controlled appliance(s) 300' and optionally to the controlled appliance(s) 300.

Figure 3:
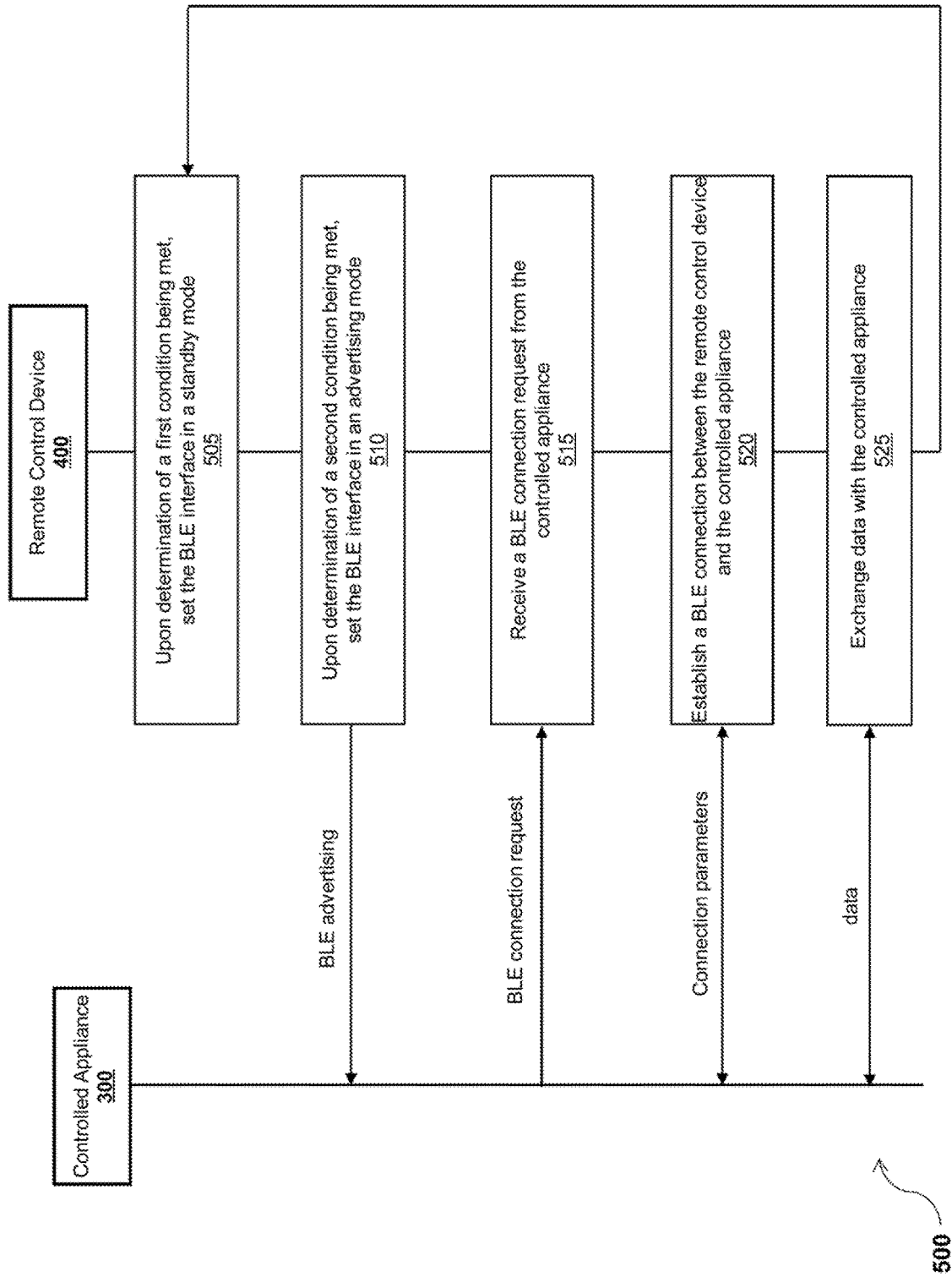
FIG. 3 represents a method implemented by the remote control device of FIGS. 1 and 2 for controlling interactions (via the BLE standard) with the controlled appliance of FIGS. 1 and 2.

Reference is now made concurrently to FIGS. 2 and 3. At least some of the steps of the method 500 represented in FIG. 3 are implemented by the remote control device 400, to control interactions (based on the BLE standard) between the remote control device 400 and the controlled appliance 300 supporting the BLE standard.

A dedicated computer program has instructions for implementing at least some of the steps of the method 500. The instructions are comprised in a non-transitory computer program product (e.g. the memory 420) of the remote control device 400. The instructions provide for controlling interactions (based on the BLE standard) between the remote control device 400 and the controlled appliance 300, when executed by the processing unit 410 of the remote control device 400. The instructions are deliverable to the remote control device 400 via communication links (e.g. via the BLE interface 430).

The method 500 comprises the step 505 of setting the BLE interface 430 in a standby mode, upon determination of a first condition being met. Step 505 is performed by the processing unit 410 of the remote control device 400.

The standby mode is a mode where the power supplied by the battery 470 to the BLE interface 430 is limited to a minimal value. Ideally, the minimal value should be no power supplied at all. The standby mode of the BLE standard is a mode where the BLE interface 430 does not emit nor receive BLE signals. However, even when the BLE interface 430 is neither emitting nor receiving BLE signals, it may still be consuming a certain amount of power. However, this certain amount of power is lower than any other amount of power consumed by the BLE interface 430 when operating in a mode different from the standby mode.

The first condition corresponds to one or more event occurring at the remote control device 400 and being detected by the processing unit 410.

For example, the first condition corresponds to the detection by the processing unit 410 that an interaction of a user with the user interface 440 of the remote control device 400 has occurred (e.g. a user has pressed a button of the user interface 440). For instance, the user interface 440 includes a sleep button. Upon pressure of the sleep button by the user, the remote control device 400 enters a sleep mode where it becomes inactive. Entering the sleep mode of the remote control device 400 triggers the setting of the BLE interface 430 in the standby mode, as per step 505.

In another example, the first condition corresponds to an inactivity timer previously setup by the processing unit 410 reaching a timeout value. For example, the timer was setup with a two minutes timeout, and two minutes have elapsed since the setup of the timer by the processing unit 410. Reaching the timeout value triggers the setting of the BLE interface 430 in the standby mode, as per step 505. The setup of the inactivity timer will be further detailed later in the description.

If the first condition can be met upon occurrence of several concurrent events, step 405 is executed when any one of the several concurrent events occurs first (e.g. the sleep button is pressed by the user before the timeout occurs, or the timeout occurs before the sleep button has a chance to be pressed by the user).

A person skilled in the art would readily understand that other first conditions may be considered for step 505.

The method 500 comprises the step 510 of setting the BLE interface 430 in a BLE advertising mode, upon determination of a second condition being met. Step 510 is performed by the processing unit 410 of the remote control device 400.

In the BLE advertising mode, BLE advertising signals are transmitted via the BLE interface 430 of the remote control device 400. Each BLE advertising signal transports a BLE advertising packet, as is well known in the art of BLE communications. The BLE advertising signals are sent on a regular basis.

The BLE advertising packet comprises an identifier (device name) of the remote control device 400, allowing the controlled appliance 300 to determine that the BLE advertising packet originates from the remote control device 400.

The processing unit 410 may stop sending BLE advertising signals upon occurrence of step 515. Therefore, the number of BLE advertising signals sent at step 510 may vary from one to many, based upon how fast the controlled appliance 300 reacts to the reception of BLE advertising signals.

The second condition occurs when the remote control device 400 needs to transmit data to the controlled appliance 300 and/or needs to receive data from the controlled appliance 300. For this purpose, a BLE connection needs to be established between the remote control device 400 and the controlled appliance 300.

In a first use case, the second condition corresponds to the occurrence of an interaction of a user with the user interface 440 of the remote control device 400. For example, a user presses a button of the user interface 440, where pressing the button generates a command to be sent to the controlled appliance 300 (for controlling operations of the controlled appliance 300). For instance, when a temperature increase button of the user interface 440 is pressed, the processing unit 410 generates a command for increasing the temperature. The temperature increase command needs to be transmitted to the controlled appliance 300. Similarly, when a temperature decrease button of the user interface 440 is pressed, the processing unit 410 generates a command for decreasing the temperature. The temperature decrease command needs to be transmitted to the controlled appliance 300. The button(s) and corresponding command(s) are not limited to adjusting a temperature, but may also include button(s) and command(s) for adjusting a lighting level, adjusting blind(s), etc.

In a second use case, the second condition corresponds to a determination by the processing unit 410 that an environmental characteristic value measured by the sensing module 460 needs to be transmitted to the controlled appliance 300. Examples of sensing modules 460 include a temperature sensing module for measuring a temperature, a humidity sensing module for measuring a humidity level, a carbon dioxide ($CO_2$) sensing module for measuring a $CO_2$ level, a lighting sensing module for measuring a lighting level, a motion detection module for detecting a movement of a person in the area, a gesture identification module for identifying a gesture of a person in the area, etc. As mentioned previously, the remote control device 400 may include several sensing modules 460, for measuring several types of environmental characteristic values, which need to be transmitted to the controlled appliance 300. For instance, a sensing timer is repeatedly setup with a timeout value (e.g. every 15 minutes) by the processing unit 410. When the sensing timer reaches its timeout value, the processing unit 410 reads the environmental characteristic value measured by the sensing module 460, which corresponds to the first condition being met. In addition to transmitting the measured environmental characteristic value, the processing unit 410 may further display this value on the display 450 of the remote control device 400.

In an alternative implementation, the environmental characteristic value measured by the sensing module 460 is displayed on the display 450 of the remote control device 400 (at regular intervals), but is not transmitted to the controlled appliance 300.

In a third use case, the second condition corresponds to a determination by the processing unit 410 that a movement of the remote control device 400 has occurred. For example, the remote control device 400 includes an equipment capable of detecting a movement of the remote control device 400, such as an accelerometer, a gyroscope, etc. If the remote control device 400 transitions from an immobile state to a detected movement, then the second condition is met. In another example, a cradle receives the remote control device 400 when it is not used by a user. The removal of the remote control device 400 from its cradle is detected and corresponds to the second condition being met. The detection of the removal is based on the determination that a contact (e.g. physical, electrical, magnetic, etc.) between the remote control device 400 and the cradle is interrupted.

A person skilled in the art would readily understand that other second conditions may be considered for step 510.

The method 500 comprises the step 515 of receiving a BLE connection request from the controlled appliance 300. Step 515 is performed by the processing unit 410 of the remote control device 400. The BLE connection request is received via the BLE interface 430 of the remote control device 400. The BLE connection request is a packet transported by a BLE signal.

The method 500 comprises the step 520 of establishing a BLE connection between the remote control device 400 and the controlled appliance 300. Step 520 is performed by the processing unit 410 of the remote control device 400. The establishment of a BLE connection between two BLE enabled devices is well known in the art of BLE communications. For instance, the processing unit 410 transmits a BLE connection response (the BLE connection response is a packet transported by a BLE signal) to the controlled appliance 300 via the BLE interface 430, to confirm the establishment of the BLE connection. The establishment of the BLE connection may also include an exchange of connection parameters between the controlled appliance 300 and the remote control device 400.

The method 500 comprises the step 525 of exchanging data with the controlled appliance 300. Step 525 is performed by the processing unit 410 of the remote control device 400. The data are exchanged via the BLE interface 430 of the remote control device 400. Step 525 is performed once the BLE connection between the remote control device 400 and the controlled appliance 300 is established, as per step 520.

Exchanging data shall be interpreted broadly and includes only transmitting data, only receiving data, or transmitting and receiving data. Thus, step 525 may include one or more transmission of data, one or more reception of data, or a combination of at least one transmission and at least one reception of data.

Various types of data may be exchanged at step 525. For example, a command for controlling operations of the controlled appliance 300 is transmitted to the controlled appliance 300, as previously mentioned with reference to step 510 (the command is generated by the processing unit 510 based on an interaction of a user with the user interface 440). As mentioned previously, the command may consist of a command for adjusting a temperature, for adjusting a lighting level, for adjusting one or more blind, etc.

In another example, an environmental characteristic value measured by the sensing module 460 of the remote control device 400 is transmitted to the controlled appliance 300, as previously mentioned with reference to step 510. As mentioned previously, the environmental characteristic value may consist of a temperature, a humidity level, a $CO_2$ level, a lighting level, a detected movement of a person in the area, an identified gesture of a person in the area, etc. (depending on which type of sensing module 460 is integrated to the remote control device 400).

In still another example, data are received from the controlled appliance 300 and displayed on the display 450 of the remote control device 400. For instance, the received data include a current environmental state enforced by the controlled appliance 300. Examples of current environmental states enforced by the controlled appliance 300 (by actuating the actuation module(s) 350) include a current temperature, a current lighting level, a current position of one or more blind, etc.

Following is an exemplary sequence of exchanges performed at step 525. It is assumed that the remote control device 400 does not include a sensing module 460 capable of measuring a temperature. The remote control device 400 sends a request to the controlled appliance 300 requiring the value of the current temperature maintained in the area by the controlled appliance 300. The remote control device 400 receives the current temperature from the controlled appliance 300, and displays the current temperature on the display 450. A user interacts with the user interface 440 to adjust the current temperature. The remote control device 400 sends a command to the controlled appliance 300 for adjusting the current temperature accordingly.

Step 525 ends with the determination that the aforementioned first condition is met, and step 505 is performed again. The remote control device 400 repeatedly executes the loop consisting of steps 505 to 525.

As mentioned previously, the transition from step 525 to step 505 is triggered by the detection by the processing unit 410 that an interaction of a user with the user interface 440 of the remote control device 400 has occurred (e.g. a user has pressed a sleep button of the user interface 440).

Alternatively, the transition from step 525 to step 505 is triggered by the detection by the processing unit 410 that an inactivity timer previously setup reaches a timeout value. For example, the inactivity timer is setup at step 520 when the BLE connection is established. Each time an exchange of data between the remote control device 400 and the controlled appliance 300 occurs at step 525, the timer is reset. However, if no exchange of data occurs for a duration equal to the timeout value, the timer expires and the transition from step 525 to 505 occurs.

A person skilled in the art would readily understand that other conditions may trigger the transition from step 525 to step 505.

Although not represented in FIG. 3 for simplification purposes, the transition from step 525 to step 505 comprises the closure of the BLE connection which was established at step 520, before entering the standby mode of step 505. In this case, the BLE connection is closed at the initiative of the remote control device 400, and the controlled appliance 300 is notified that the BLE connection has been closed.

In the case where the BLE connection is closed at the initiative of the controlled appliance 300, the remote control device 400 is notified that the BLE connection has been closed. This closure notification is another example of the first condition which triggers the execution of step 505.

The execution of the method 500 is not limited to the remote control device 400 of FIG. 3, which has been previously described as consisting of a traditional remote control or a mobile device (e.g. a smartphone or a tablet) implementing a remote control functionality.

The method 500 can also be executed by any computing device comprising the BLE interface 430, the processing unit 410, the memory 420, and a power supply for powering at least the BLE interface 430. The power supply is not limited to the battery 470 of FIG. 3, but may consist of any type of power supply. Optionally, the computing device further comprises at least one of the user interface 440, the display 450 and the sensing module 460.

Reference is now made concurrently to FIGS. 2, 3 and 4. At least some of the steps of the method 600 represented in FIG. 4 are implemented by the controlled appliance 300 supporting the BLE standard, to control interactions (based on the BLE standard) between the controlled appliance 300 and the remote control device 400.

A dedicated computer program has instructions for implementing at least some of the steps of the method 600. The instructions are comprised in a non-transitory computer program product (e.g. the memory 320) of the controlled appliance 300. The instructions provide for controlling interactions (based on the BLE standard) between the controlled appliance 300 and the remote control device 400, when executed by the processing unit 310 of the controlled appliance 300. The instructions are deliverable to the controlled appliance 300 via communication links (e.g. via the BLE interface 330 or the other communication interface 340 if present).

The method 600 comprises the step 605 of setting the BLE interface 330 in a scanning mode. Step 605 is performed by the processing unit 310 of the controlled appliance 300. The scanning mode is a mode where the BLE interface 330 is capable of receiving BLE signals from other BLE enabled devices. As mentioned previously, in the scanning mode, the controlled appliance 300 searches for other devices which are emitting BLE signals in the vicinity.

The method 600 comprises the step 610 of determining if a BLE advertising signal (a BLE advertising packet is transported by the BLE advertising signal) has been received from the remote control device 400. Step 610 is performed by the processing unit 310 of the controlled appliance 300. The BLE advertising signal is received via the BLE interface 330 of the controlled appliance 300.

If no BLE advertising signal has been received, the method 600 proceeds to step 605 and remains in the scanning mode.

If a BLE advertising signal has been received, the method 600 proceeds to step 615.

The method 600 comprises the step 615 of establishing a BLE connection between the controlled appliance 300 and the remote control device 400. Step 615 is performed by the processing unit 310 of the controlled appliance 300.

The BLE connection is established through the BLE interface 330 of the controlled appliance 300. The establishment of a BLE connection between two BLE enabled devices is well known in the art of BLE communications. The processing unit 310 transmits a BLE connection request (a BLE connection request packet transported by a BLE signal) to the remote control device 400 via the BLE interface 330. As mentioned previously with reference to step 520 of the method 500, the establishment of the BLE connection may further include an exchange of connection parameters between the controlled appliance 300 and the remote control device 400.

The controlled appliance 300 may receive BLE advertising signals from a plurality of devices. Each BLE advertising packet transported by a given BLE advertising signal generally comprises an identifier (device name) of the corresponding advertising device. The processing unit 310 performs step 615 only if the identifier (device name) of the advertising device corresponds to the remote control device 400. For this purpose, the controlled appliance 300 is configured with the identifier of the remote control device 400, which is stored in the memory 320 of the controlled appliance 300. Although not represented in FIG. 4 for simplification purposes, if the identifier transported by the received BLE advertising packet does not match the identifier of the remote control device 400 stored in the memory 320, the method proceeds to step 605 instead of step 615 after step 610.

The method 600 comprises the step 620 of exchanging data with the remote control device 400. Step 620 is performed by the processing unit 310 of the controlled appliance 300. The data is exchanged via the BLE interface 330 of the controlled device 300. Step 620 is performed once the BLE connection between the controlled appliance 300 and the remote control device 400 is established, as per step 615.

As mentioned previously in reference to step 525 of the method 500, exchanging data shall be interpreted broadly and includes only transmitting data, only receiving data, or transmitting and receiving data. Thus, step 620 may include one or more transmission of data, one or more reception of data, or a combination of at least one transmission and at least one reception of data.

As mentioned previously in reference to step 525 of the method 500, various types of data may be exchanged at step 620. For example, a command for controlling operations of the controlled appliance 300 (e.g. a command for adjusting a temperature, for adjusting a lighting level, for adjusting one or more blind, etc.) is received from the remote control device 400. In another example, an environmental characteristic value measured by the sensing module 460 (e.g. a temperature, a humidity level, a CO2 level, a lighting level, a detected movement of a person in the area, an identified gesture of a person in the area, etc.) is received from the remote control device 400. In still another example, data are transmitted to the remote control device 400 (e.g. for being displayed on the display 450 of the remote control device 400). For instance, the transmitted data include a current environmental state enforced by the controlled appliance 300. Examples of current environmental states enforced by the controlled appliance 300 (by actuating the actuation module(s) 350) include a current temperature, a current lighting level, a position of one or more blind, etc.

The method 600 comprises the optional step 625 of applying a command (received at step 620) to the actuation module 350 of the controlled appliance 300. Step 625 is performed by the processing unit 310 of the controlled appliance 300. Step 625 is optional and is performed only if a command for controlling operations of the actuation module 350 has been received from the remote control device 400 at step 620.

As mentioned previously, the controlled appliance 300 may include more than one actuation module 350. Thus, a given received command is applied to one or more actuation module 350. Furthermore, a plurality of commands may be received at step 620, each command being respectively applied to one or more actuation module 350.

For instance, the controlled appliance 300 comprises one or more actuation module 350 for adjusting a temperature. Alternatively or complementarily, the controlled appliance 300 comprises one or more actuation module 350 for adjusting a lighting level. Alternatively or complementarily, the controlled appliance 300 comprises one or more actuation module 350 for adjusting one or more blind. One or more of these exemplary actuation modules are remotely controlled by the remote control device 400 when performing the methods 300 and 400.

The method 600 comprises the step 630 of closing the BLE connection established at step 615. Step 630 is performed by the processing unit 310 of the controlled appliance 300.

The BLE connection is closed at the initiative of the controlled appliance 300, in which case the remote control device 400 is notified that the BLE connection has been closed. Alternatively, The BLE connection is closed at the initiative of the remote control device 400, in which case the controlled appliance 300 is notified that the BLE connection has been closed.

Following step 630, step 605 is performed again. The controlled appliance 300 repeatedly executes the loop consisting of steps 605 to 630.

In the case where the data received from the remote control device 400 at step 620 consist of an environmental characteristic value measured by the sensing module 460 of the remote control device 400, the method 600 comprises the optional step (not represented in FIG. 4) of displaying (by the processing unit 310) the received environmental characteristic value on the display 360 of the controlled appliance 300. Alternatively or complementarily, the method 600 comprises the optional step (not represented in FIG. 4) of overwriting (by the processing unit 310) a current value of the environmental characteristic stored in the memory 320 of the controlled appliance 300 with the received environmental characteristic value. Alternatively or complementarily, the method 600 comprises the optional step (not represented in FIG. 4) of forwarding (by the processing unit 310) the received environmental characteristic value to the environment controller 100. The forwarding is performed via the other communication interface 340 of the controlled appliance 300. Alternatively, the forwarding may be performed via the BLE interface 330 of the controlled appliance 300, if the environment controller 100 also comprises a communication interface supporting the BLE standard (the BLE connection established at step 625 cannot be used for this purpose).

In a particular implementation, the processing unit 310 concurrently sets the BLE interface in an advertising mode (not represented in the Figures) where the BLE interface 330 transmits BLE advertising signals, and in the scanning mode (as per step 605) where the BLE interface 330 is capable of receiving BLE advertising signals from other devices. The scanning mode enables the controlled appliance 300 to detect the BLE advertising signals sent by the remote control device 400 (as per step 610). The advertising mode enables the controlled appliance 300 to advertise its presence and availability to other devices (e.g. a smartphone or a tablet with a BLE interface) in the vicinity, so that the other devices may initiate a BLE connection procedure with the controlled appliance 300.

One objective of the methods 500 and 600 is to save energy on the remote control device 400, by limiting the power consumed by the BLE interface 430. It has been established experimentally that it is more efficient in terms of power consumption to have the remote control device 400 sends the BLE advertising signals and have the controlled appliance 300 initiate the BLE connection with the remote control device 400, instead of the usual mode of operations where the controlled appliance 300 sends the BLE advertising signals and the remote control device 400 initiates the BLE connection with the controlled appliance 300.

The methods 500 and 600 are not limited to the BLE standard, but also apply to any other radio frequency (RF) standard having characteristics similar to the BLE standard. The other RF standard needs to support the previously described functionalities required for performing the steps of the methods 500 and 600.

The method 500 is performed by the remote control device 400 with the interface 430 supporting the other RF standard instead of the BLE standard. The battery 470 powers at least the RF communication interface 430.

Step 505 consists in setting the RF communication interface 430 in a standby mode where the power supplied by the battery 470 to the RF communication interface 430 is limited to a minimal value, upon determination of a first condition being met.

Step 510 consists in setting the RF communication interface 430 in an advertising mode where at least one RF advertising signal is transmitted via the RF communication interface 430, upon determination of a second condition being met. The RF advertising signal advertises the availability of the remote control device 400 for establishing a connection. The RF advertising signal can be received by other devices supporting the RF standard and being within range of the remote control device 400.

Step 515 consists in receiving via the RF communication interface 430 a connection request from the controlled appliance 300.

Step 520 consists in establishing a connection between the remote control device 400 and the controlled appliance 300 through the RF communication interface 330. The connection is compliant with the RF standard.

Step 525 consists in exchanging data with the controlled appliance 300 via the RF communication interface 430.

The method 600 is performed by the controlled appliance 300 with the interface 330 supporting the other RF standard instead of the BLE standard.

Step 605 consists in setting the RF communication interface 330 in a scanning mode where the RF communication interface 330 is capable of receiving RF signals from other devices.

Step 610 consists in determining if a RF advertising signal has been received from the remote control device 400 via the RF communication interface 330.

Step 615 consists in establishing a connection between the controlled appliance 300 and the remote control device 400 through the RF communication interface 330.

Step 620 consists in exchanging data with the remote control device 400 via the RF communication interface 330.

Step 625 consists in, upon reception from the remote control device 400 via the RF communication interface 330 of a command for controlling operations of the actuation module 350, applying the command to the actuation module 350.

Step 630 consists in closing the RF connection.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A remote control device comprising:
   a radio frequency (RF) communication interface;
   a sensing module;
   a battery for powering at least the RF communication interface; and
   a processing unit for:
      upon determination of a first condition being met, setting the RF communication interface in a standby mode where the power supplied by the battery to the RF communication interface is limited to a minimal value;
      upon determination of a second condition being met, the second condition consisting of a determination by the processing unit that an environmental characteristic value measured by the sensing module needs to be transmitted, transmitting at least one RF advertising signal via the RF communication interface;
      receiving via the RF communication interface a connection request from a controlled appliance;
      establishing a connection between the remote control device and the controlled appliance through the RF communication interface; and
      exchanging data with the controlled appliance via the RF communication interface, the exchange of data comprising transmitting to the controlled appliance the environmental characteristic value measured by the sensing module.

2. The remote control device of claim 1, wherein the RF communication interface is a Bluetooth® Low Energy (BLE) communication interface, and the BLE communication interface does not emit nor receive BLE signals in the standby mode.

3. The remote control device of claim 1, wherein the RF advertising signal transports an identifier of the remote control device.

4. The remote control device of claim 1 further comprising a user interface, wherein prior to the determination that the first condition is met, the processing unit transmits to the controlled appliance via the RF communication interface a command for controlling operations of the controlled appliance, the command being generated by the processing unit based on an interaction of a user with the user interface of the remote control device.

5. The remote control device of claim 4, wherein the command comprises a command for adjusting a temperature, a command for adjusting a lighting level or a command for adjusting one or more blind.

6. The remote control device of claim 1, wherein the environmental characteristic value comprises a temperature, a humidity level, a carbon dioxide ($CO_2$) level, a lighting level, a detected movement of a person or an identified gesture of a person.

7. The remote control device of claim 1 further comprising a display, wherein prior to the determination that the first condition is met, the processing unit receives data from the controlled appliance via the RF communication interface, the received data being displayed on the display.

8. The remote control device of claim 1, wherein the first condition comprises a detection by the processing unit that an interaction of a user with a user interface of the remote control device has occurred or an inactivity timer reaching a timeout value.

9. A method for controlling interactions between a remote control device and a controlled appliance, the method comprising:
   upon determination by a processing unit of the remote control device that a first condition is met; setting an RF communication interface of the remote control device in a standby mode where the power supplied by a battery of the remote control device to the RF communication interface is limited to a minimal value;
   upon determination by the processing unit that a second condition is met, the second condition consisting of a determination by the processing unit that an environmental characteristic value measured by a sensing module of the remote control device needs to be transmitted, transmitting at least one RF advertising signal via the RF communication interface;
   receiving by the processing unit via the RF communication interface a connection request from the controlled appliance;
   establishing by the processing unit a connection between the remote control device and the controlled appliance through the RF communication interface; and
   exchanging by the processing unit data with the controlled appliance via the RF communication interface, the exchange of data comprising transmitting to the controlled appliance the environmental characteristic value measured by the sensing module of the remote control device.

10. The method of claim 9, wherein the RF communication interface is a Bluetooth® Low Energy (BLE) communication interface, and the BLE communication interface does not emit nor receive BLE signals in the standby mode.

11. The method of claim 9, wherein the RF advertising signal transports an identifier of the remote control device.

12. The method of claim 9, wherein the remote control device further comprises a user interface, and the method further comprises prior to the determination that the first condition is met, transmitting by the processing unit to the controlled appliance via the RF communication interface a command for controlling operations of the controlled appliance, the command being generated by the processing unit based on an interaction of a user with the user interface of the remote control device.

13. The method of claim 12, wherein the command comprises a command for adjusting a temperature, a command for adjusting a lighting level or a command for adjusting one or more blind.

14. The method of claim 9, wherein the environmental characteristic value comprises a temperature, a humidity level, a carbon dioxide ($CO_2$) level, a lighting level, a detected movement of a person or an identified gesture of a person.

15. The method of claim 9, wherein the remote control device further comprises a display, and the method further comprises prior to the determination that the first condition is met, receiving by the processing unit data from the controlled appliance via the RF communication interface, the received data being displayed on the display.

16. The method of claim 9, wherein the first condition comprises a detection by the processing unit that an interaction of a user with a user interface of the remote control device has occurred or an inactivity timer reaching a timeout value.

17. A non-transitory computer program product comprising instructions executable by a processing unit of a remote control device, the execution of the instructions by the processing unit of the remote control device providing for controlling interactions between the remote control device and a controlled appliance by:
- upon determination by the processing unit that a first condition is met, setting an RF communication interface of the remote control device in a standby mode where the power supplied by a battery of the remote control device to the RF communication interface is limited to a minimal value;
- upon determination by the processing unit that a second condition is met, the second condition consisting of a determination by the processing unit that an environmental characteristic value measured by a sensing module of the remote control device needs to be transmitted, transmitting at least one RF advertising signal via the RF communication interface;
- receiving by the processing unit via the RF communication interface a connection request from the controlled appliance;
- establishing by the processing unit a connection between the remote control device and the controlled appliance through the RF communication interface; and
- exchanging by the processing unit data with the controlled appliance via the RF communication interface, the exchange of data comprising transmitting to the controlled appliance the environmental characteristic value measured by the sensing module of the remote control device.

18. The computer program product of claim 17, wherein the RF communication interface is a Bluetooth® Low Energy (BLE) communication interface, and the BLE communication interface does not emit nor receive BLE signals in the standby mode.

19. A computing device comprising:
- a radio frequency (RF) communication interface;
- a power supply for powering at least the RF communication interface; and
- a processing unit for:
  - upon determination of a first condition being met, setting the RF communication interface in a standby mode where the power supplied by the power supply to the RF communication interface is limited to a minimal value;
  - upon determination of a second condition being met, the second condition consisting of a determination by the processing unit that an environmental characteristic value measured by a sensing module of the computing device needs to be transmitted, transmitting at least one RF advertising signal via the RF communication interface;
  - receiving via the RF communication interface a connection request from a controlled appliance;
  - establishing a connection between the computing device and the controlled appliance through the RF communication interface; and
  - exchanging data with the controlled appliance via the RF communication interface, the exchange of data comprising transmitting to the controlled appliance the environmental characteristic value measured by the sensing module of the remote control device.

20. The computing device of claim 19, wherein the RF communication interface is a Bluetooth® Low Energy (BLE) communication interface, and the BLE communication interface does not emit nor receive BLE signals in the standby mode.

* * * * *